May 7, 1940.   B. MARSAK   2,200,033
VACUUM BREAKER
Filed June 27, 1939
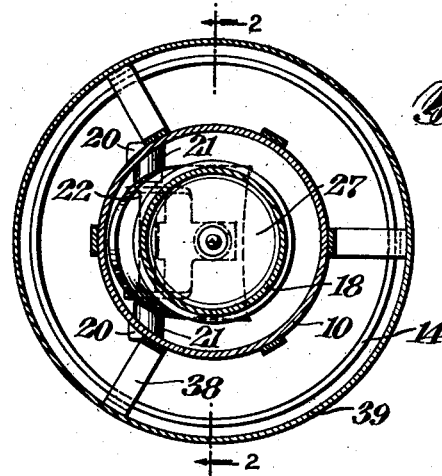
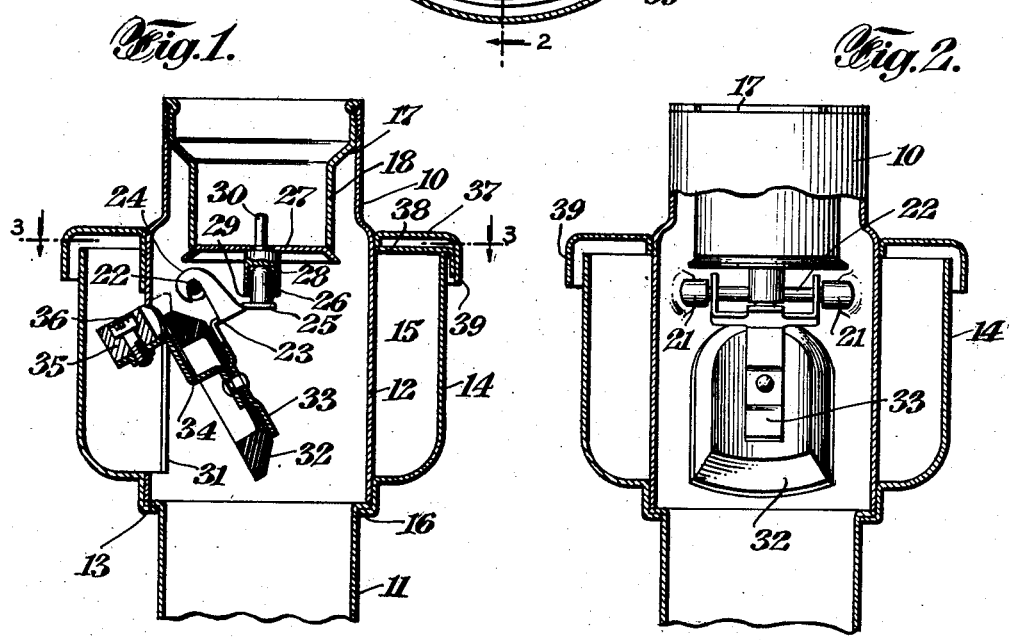
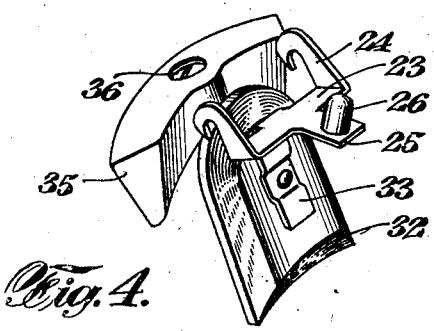
INVENTOR
Bernard Marsak
BY
Kenyon & Kenyon
ATTORNEYS Patented May 7, 1940

2,200,033

UNITED STATES PATENT OFFICE 2,200,033

VACUUM BREAKER

Bernard Marsak, Laurelton, Long Island, N. Y.

Application June 27, 1939, Serial No. 281,341

5 Claims. (Cl. 137—69)

This invention relates to vacuum breakers for use in connection with flushing valves. Such valves have an outlet tail-piece which leads to the device to be flushed such, for example, as a toilet bowl. Unless there is provision for breaking the vacuum existing in the tail-piece after operation of the flush valve, water may be reversely supplied from the device being flushed into the water supply system. Therefore, in many localities, it is mandatory that newly installed flush valves be equipped with a vacuum breaker.

An object of this invention is a vacuum breaker which is of simple and sturdy structure, low manufacturing cost, quiet and highly efficient in operation, easy to install or replace and in effect constitutes an integral part of the flush valve tail-piece.

Other objects, novel features and advantages of this invention will become apparent from the following specification and accompanying drawing, wherein:

Fig. 1 is a vertical section through a flushing valve tail-piece equipped with a vacuum breaker embodying the invention;

Fig. 2 is a section similar to Fig. 1 at right angles thereto, partly in elevation.

Fig. 3 is a section on the line 3—3 of Fig. 1, and

Fig. 4 is a perspective view of interior mechanism of the device.

A tubular tail-piece composed of the sections 10 and 11 leads from the flush valve, not shown, to a device to be flushed, also not shown. The section 10 is provided with a portion 12 of enlarged diameter, the lower end of which engages an outwardly turned flange 13 on the section 11, the periphery of the flange being flush with the outer surface of the portion 12. A tubular member 14 of materially larger diameter than the portion 12 surrounds the latter forming a chamber 15 and is inturned at its lower portion tightly to fit the portion 12 with a flange 16 underlying the flange 13. The flanges 13 and 16 are suitably joined together, for example, by soldering, and the portion of the tubular member 14 contacting the portion 12 is likewise joined thereto. A tubular member 17 is threaded into the upper end of the section 10 and has a depending portion 18 of reduced diameter, the lower edge of which constitutes a valve seat 19.

The wall of the portion 12 is provided with two recesses 20 opening into the interior of said portion to receive heads 21 provided at each end of a pin 22. A bracket 23 is provided with a pair of hooks 24 which are spaced apart and fit over the pin 22 to pivotally support the bracket from the pin. A portion 25 of the bracket extends laterally to substantially the axis of the tail-piece and supports an upstanding pin 26. A valve disk 27 having a tapered periphery is adapted to engage the bottom edge 19 of the tubular member 17 and is equipped with a stud 28 having a downwardly facing socket 29 into which the pin 26 fits. A handle member 30 which may be part of stud 28 is provided on the disk 27 for lifting the disk off from and on to the pin 26.

The wall of the portion 12 is cut away below the pin 22 at one side to provide a passageway 31, the bottom of which is flush with the bottom of the chamber 15. A closure 32 preferably of rubber or similar resilient material and shaped to close the passageway 31 is carried by a depending part 33 of the bracket 23. The part 33 also carries an arm 34 which extends from the bracket through the passageway 31 into the chamber 15. A weight 35 is attached to the arm 34 by a bolt 36, the head of which is accessible through the top of the chamber 15, the weight being of such configuration that it may be passed through the top of the chamber into and out of assembled relation with the arm 34. The top of the chamber 15 is normally covered by an annular cover 37, which is equipped with a plurality of arms 38 engaging the top of the tubular member 14 and offset from the cover sufficiently to maintain the latter spaced from the top edge of the tubular member 14. The cover 37 is provided with a downturned peripheral flange 39 of sufficiently greater diameter than the tubular member 14 that the chamber 15 is always in full communication with the atmosphere.

When no liquid is flowing through the tail-piece, the parts are in the position shown in Fig. 1 with the valve 27 seated against the bottom edge 19 of the tubular member 18 and with the closure 32 spaced from the passage 31, so that the lower portion of the tail-piece is in communication with atmosphere. The parts are held in this position by the weight 35. When liquid is flowing through the tail-piece in the direction of the arrow, the liquid forces the valve 27 downwardly to a sufficient extent to bring the closure 32 against the wall of the portion 12, thereby closing the passageway 31 and preventing the flow of liquid outwardly through the passageway. Upon cessation of liquid flow, the parts, due to action of weight 35 are returned by gravity to the position shown in Fig. 1, thus permitting air to flow inwardly through the passageway 31 into the tail-piece and thus break the vacuum existing therein.

The closure 32 is held in open position by gravity when there is no water flowing through the tail-piece and movement of the closure into closing position is effected by the pressure of flowing water against the valve 27. The valve 27 is supported on the pin 26 with sufficient freedom of movement that it readily seats against the bottom edge 19 of the tubular member 17. There are no springs and the structure is such that it will operate for an indefinite period of time without appreciable wear.

Due to its construction, the vacuum breaker operates noiselessly and is both simple and economical to manufacture. The vent opens as soon as the flow of liquid stops, thus immediately breaking the vacuum and preventing reverse liquid flow through the tail-piece.

In assembling the device above described, the bracket 23 with the weight 35 detached is introduced through the top end of the portion 10 and the hooks 24 are engaged with the pin 22, it being understood that the tubular portion 17 has not yet been put in place. The valve disk 27 is then engaged with the pin 26 and the weight 35 is connected to the arm 34 by introducing the weight into proper position through the top of the chamber 15, the cover 38 first having been removed. The weight 35 is then attached to the arm 34 by the bolt 36, it being possible to insert a screw-driver for rotating the bolt 36 through the open top of the chamber 15. After the cover 37 and the tubular member 17 have been put in their proper places the device is ready for operation. The removal of the bracket is effected by reversing the procedure just described.

I claim:

1. In combination, a flushing valve tail-piece having a vent passage in its wall and a coaxial valve seat, a pivot pin extending transversely of said tail-piece adjacent the wall thereof, a bracket having hooks engageable with said pin to pivotally support said bracket, a closure carried by said bracket for movement into and out of closing relation to said vent passage, a valve disk supported by said bracket for movement into and out of engagement with said valve seat, an arm extending from said bracket through said passage, and a weight carried by said arm exterior of said tail-piece tending to maintain said closure out of closing relation to said passage.

2. In combination, a flushing valve tail-piece having a vent passage in its wall and a coaxial valve seat, a pivot pin extending transversely of said tail-piece adjacent the wall thereof, a bracket having hooks engageable with said pin to pivotally support said bracket, a closure carried by said bracket for movement into and out of closing relation to said vent passage, a pin on said bracket, a valve disk having a recess receiving said pin and adapted for movement by said bracket into and out of engagement with said valve seat, an arm extending from said bracket through said passage, and a weight carried by said arm exterior of said tail-piece tending to maintain said closure out of closing relation to said passage.

3. In combination, a flushing valve tail-piece having a vent passage in its wall, a pivot pin extending transversely of said tail-piece adjacent the wall thereof, a bracket having hooks engageable with said pin to pivotally support said bracket and having a portion extending into the path of liquid flowing through said tail-piece, a closure carried by said bracket for movement into and out of closing relation to said vent passage, an arm extending from said bracket through said passage, and a weight carried by said arm exterior of said tail-piece tending to maintain said closure out of closing relation to said passage.

4. In combination a flushing valve tail-piece having a vent passage in its wall, a tubular member surrounding said tail-piece in spaced relation thereto and having one end inturned into engagement with the tail-piece at the lower edge of the vent passage, a pivot pin extending transversely of said tail-piece adjacent the wall thereof, a bracket having hooks engageable with said pin to pivotally support said bracket, a closure carried by said bracket for movement into and out of closing relation to said vent passage, an arm extending from said bracket through said passage, and a weight carried by said arm exterior of said tail-piece and tending to maintain said closure out of closing relation to said passage.

5. In combination, a flushing valve tail-piece having a coaxial valve seat and having a vent passage in its wall, a tubular member surrounding said tail-piece in spaced relation thereto and having one end inturned into engagement with the tail-piece at the lower edge of the vent passage, a pivot pin extending transversely of said tail-piece adjacent the wall thereof, a bracket having hooks engageable with said pin to pivotally support said bracket, a disk supported by said bracket for movement into and out of engagement with said valve seat, a closure carried by said bracket for movement into and out of closing relation to said vent passage, an arm extending from said bracket through said passage, a weight carried by said arm exterior of said tail-piece and tending to maintain said closure in closing relation to said vent passage and said valve disk out of engagement with said valve seat.

BERNARD MARSAK.